United States Patent [19]

Denenberg et al.

[11] 3,714,595

[45] Jan. 30, 1973

[54] DEMODULATOR USING A PHASE LOCKED LOOP

[75] Inventors: Jeffrey N. Denenberg, Chicago; William J. Padgett, Berwyn, both of Ill.

[73] Assignee: Warwick Electronics Inc.

[22] Filed: March 25, 1971

[21] Appl. No.: 128,004

[52] U.S. Cl. ................329/122, 179/15 BT, 325/346, 325/419, 329/50, 331/23

[51] Int. Cl. ................H03d 3/24

[58] Field of Search .............179/15 BT; 329/50, 122; 325/346, 419; 331/18, 23, 25

[56] References Cited

UNITED STATES PATENTS

| | | | |
|---|---|---|---|
| 3,401,353 | 9/1968 | Hughes | 331/18 |
| 3,163,823 | 12/1964 | Kellis et al. | 325/419 X |
| 3,283,079 | 11/1966 | Dixon | 179/15 BT |
| 3,466,399 | 9/1969 | Dias | 179/15 BT |

*Primary Examiner*—Alfred L. Brody
*Attorney*—Hofgren, Wegner, Allen, Stellman & McCord

[57] ABSTRACT

An FM stereo demodulator uses a phase locked loop to synchronize a 76 kHz oscillator with a received 19 kHz pilot. A two stage binary frequency divider is coupled in cascade with the oscillator to provide a symmetrical 38 kHz waveform for carrier reinsertion and a 19 kHz waveform for phase comparison. The received pilot is coupled to a phase detector in the phase locked loop through a high pass filter formed of passive components. A pilot detector uses EXCLUSIVE OR gates coupled to the frequency divider to develop a 19 kHz waveform in phase with the pilot for phase comparison with the received composite signal to determine the presence of the received pilot.

11 Claims, 3 Drawing Figures

INVENTORS.
JEFFREY N. DENENBERG
WILLIAM J. PADGETT
BY Hofgren, Wegner, Allen, Stellman & McCord.
ATTORNEYS.

DEMODULATOR USING A PHASE LOCKED LOOP

This invention relates to a demodulator, and more particularly to a demodulator using a phase locked loop.

Typical FM stereo multiplex demodulators reconstitute a 38 kHz carrier for synchronous demodulation of a DSBSC subchannel by filtering a received composite signal to recover a 19 kHz pilot. The recovered pilot is then coupled to a frequency doubler to obtain a reinsertion carrier. Such demodulators are not well suited to circuit integration, since inductors are necessary.

In accordance with the present invention, a demodulator for a composite signal having both a reference component (as a 19 kHz pilot) and an information modulated component (as a 38 kHz DSBSC subchannel) uses a phase locked loop to regenerate an insertion carrier for synchronous demodulation. Conventional phase locked loops use a voltage controlled oscillator (VCO) having a center oscillator frequency at or near the expected input frequency. However, it is difficult and costly to produce a VCO which has the symmetry in its output waveform which is necessary for synchronous demodulation.

The present invention overcomes the disadvantages of prior phase locked loops by using a VCO having an output frequency which is an integer multiple of the frequency to be locked. The VCO output is coupled to a frequency divider having a symmetrical output which is used to lock with an incoming frequency and to provide a reinsertion carrier. As a result, the design of the VCO itself is not critical, and in fact the VCO desirably generates an asymmetrical waveform.

Other advantages over prior demodulators are also provided by several circuits which are novel in combination with the demodulator circuit. A high pass filter of simple design, formed by only RC passive components, is located between a composite signal source and the phase detector for the pilot signal. It has been found that elimination of the lower frequency components of the composite signal prevents phase jitter in the VCO. An in-phase detector for detecting the presence of the pilot signal uses EXCLUSIVE OR gating in order to generate a reference waveform which has no ambiguity with respect to the phase of the pilot signal.

One object of this invention is the provision of an improved demodulator using a phase locked loop incorporating a controlled oscillator of higher frequency than the frequency to be locked.

Another object of this invention is the provision of an FM stereo demodulator having a passive high pass filter input to a phase detector for the pilot signal.

A further object of this invention is the provision of an improved pilot detector using EXCLUSIVE OR gating for generating a reference component with no phase ambiguity.

Further advantages and features of the invention will be apparent from the following description, and from the drawings, in which.

Figure 1:
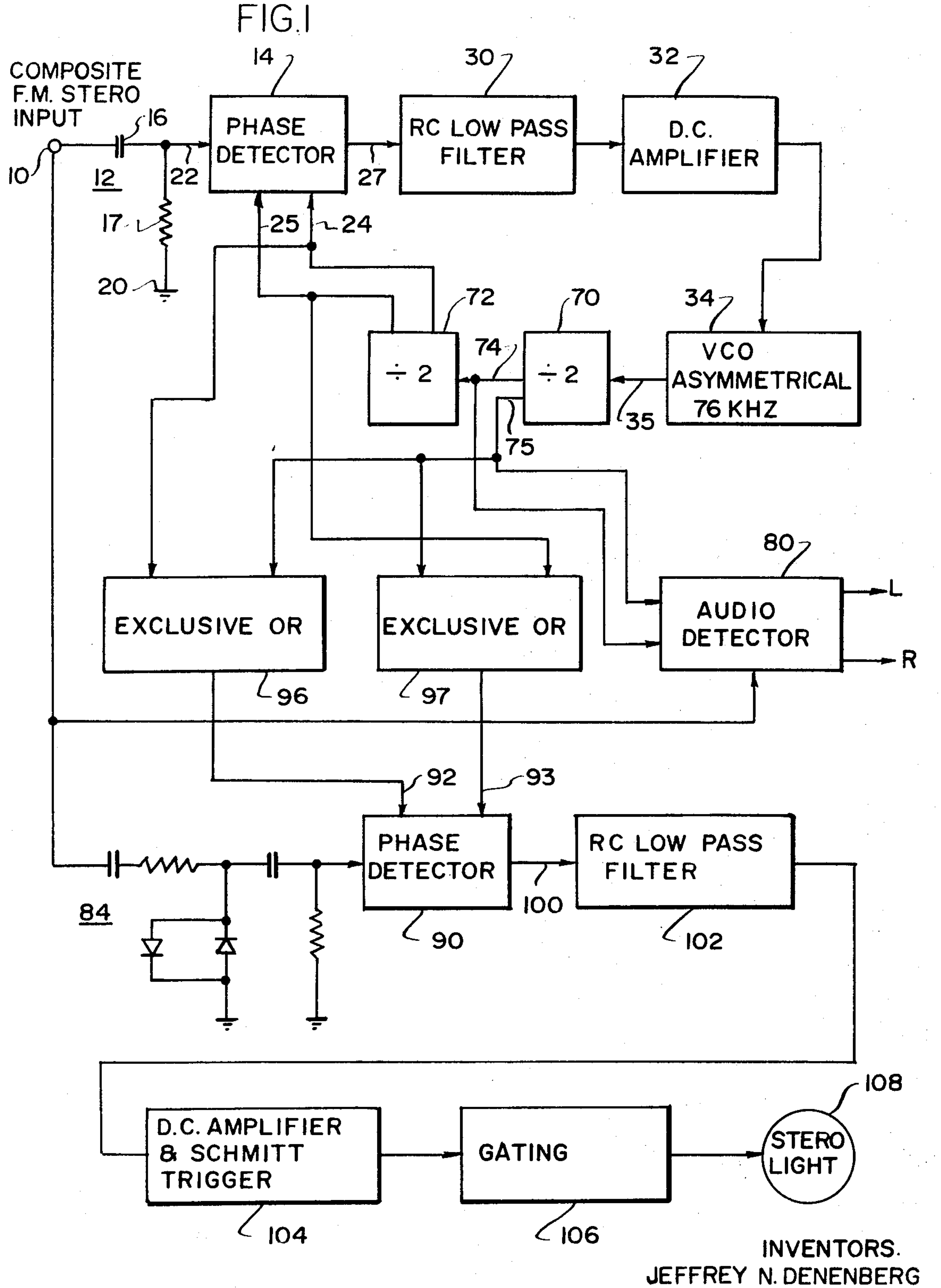
FIG. 1 is a partly blocked and partly schematic diagram of the invention.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and types are merely representative and are not critical unless specifically so stated.

Turning to FIG. 1, a demodulator is illustrated for an FM stereo multiplex composite signal. Such a signal can be described as a time domain multiplex signal or as a composite signal in the frequency domain, having an L+R main channel, an L−R subcarrier channel, and a reduced amplitude pilot signal at one-half the subcarrier frequency to aid in the demodulation process. The subcarrier channel is a double sideband suppressed carrier (DSBSC) signal originally modulated on a 38 kilohertz (kHz) sine wave. A fourth component known as SCA or storecast may also be present in some cases, and consists of a third audio signal FM modulated on a second subcarrier.

The composite signal is available at an input terminal 10 from any conventional FM stereo receiver. A high pass filter 12 connects the terminal source 10 to a channel for reconstructing the 38 kHz carrier for reinsertion purposes. Filter 12 is an RC network formed of solely passive components, and designed to have a very small phase shift at 19 kHz to prevent a phase error in the reconstituted carrier. Filter 12 is used to prevent phase jitter in the channel when low frequency audio is present. It has been found that a simple one stage network is sufficient, consisting of a capacitor 16 in series between terminal 10 and a phase detector 14, and a shunt connected resistor 17 located between the series capacitor 16 and a source of reference potential or ground 20.

Phase detector 14 forms a part of a phase locked loop (PLL). A reference input 22 is coupled to the pilot signal passed by filter 12. For phase comparison, a pair of inputs 24 and 25 are coupled to a source of locally generated divided signal which is to be phase locked with the pilot signal. When the loop is locked, the signals at inputs 24, 25 are 90° from the signal at reference input 22, producing a reference DC voltage at an output 27. In response to a phase difference or shift from this 90° or quadrature relationship, a voltage is generated at output 27 having an average DC level proportional to the phase difference or shift from 90°. Phase detector 14 may be any conventional multiplier circuit, such as an RCA integrated circuit, type CA3054, which integrated circuit requires a pair of opposite symmetrical square waves as a switching signal (at inputs 24, 25) and any arbitrary waveform (at input 22) for phase comparison.

The output of phase detector 14 is coupled to a low pass loop filter 30, consisting of a simple, one-secton RC network. Such a one-section design insures that the phase shift introduced by the filter itself is always less than or equal to 90° to aid in stabilizing the loop. The filter 30 provides the necessary selectivity to the loop when the RC time constant is approximately 30 microseconds.

The output of filter 30 is coupled to a DC amplifier 32, which is only necessary when the transfer gains of the phase detector 14 and the VCO are too low. The amplifier desirably should introduce little phase shift into the loop, to prevent instability. A standard operational amplifier, such as a Motorola integrated circuit type MC1430, having a DC gain set by a feedback network, is satisfactory. Since an operational amplifier requires compensation for its own stability, it will introduce some additional phase shift which will make the choice of the loop filter 30 more critical.

The DC output from amplifier 32 controls a voltage controlled oscillator (VCO) 34 having a center frequency which is an integral multiple of the frequency of the pilot signal, and desirably is four times the 19 kHz pilot frequency, i.e., 76 kHz. The VCO can have any arbitrary shaped output waveform on an output line 35, and herein comprises an asymmetrical square wave, FIG. 2A. By way of example, a particular VCO 34 suitable for use in the PLL is illustrated in detail in FIG. 3.

Figure 3:
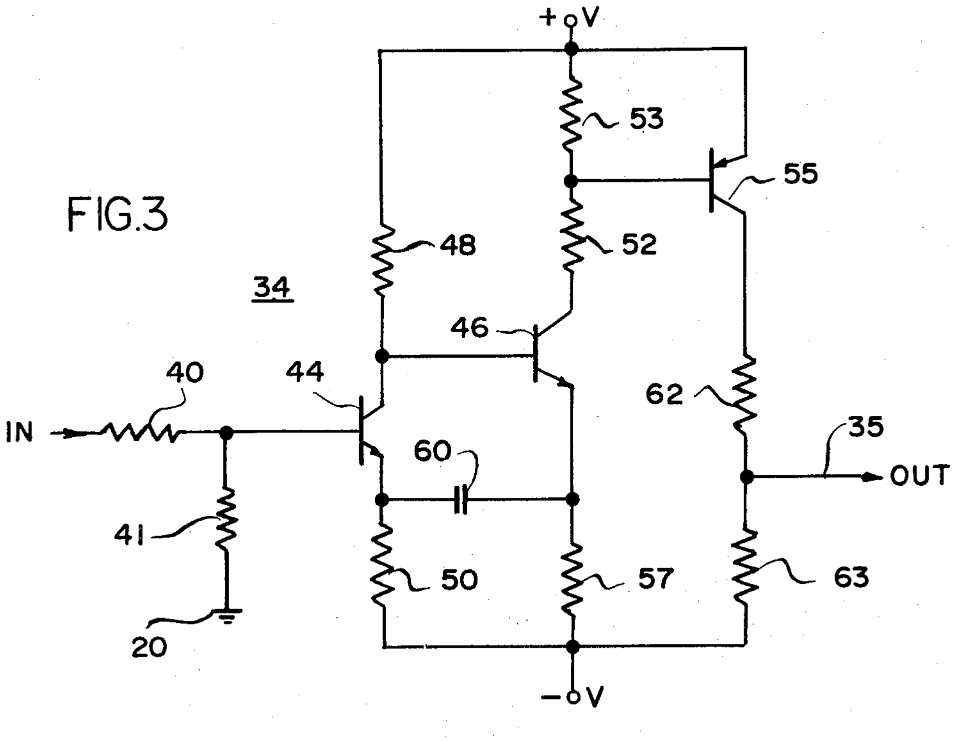
FIG. 3 is a schematic diagram of the VCO illustrated in block form in FIG. 1.

Turning to FIG. 3, VCO 34 comprises an emitter coupled astable multivibrator having a free base to control frequency. A voltage divider, consisting of a 2.7 kilohm resistor 40 in series with a 1 kilohm resistor 41, is coupled between ground 20 and the input, labeled IN, from DC amplifier 32. The junction between resistors 40 and 41 is coupled to the base of an NPN transistor 44, having a collector directly connected to the base of a second NPN transistor 46. The collector of transistor 44 is coupled through a 6.8 kilohm resistor 48 to a source of positive DC potential or +V, such as 6 volts. The emitter of transistor 44 is coupled through a 5.6 kilohm resistor 50 to a source of negative DC potential or −V, such as −6 volts. The collector of transistor 46 is coupled through a 560 ohm resistor 52 and a second 560 ohm resistor 53 to +V. The junction between resistors 52 and 53 is directly coupled to the base of a PNP transistor 55 having its emitter directly coupled to +V. The emitter of transistor 46 is coupled through a 5.6 kilohm resistor 57 to −V, and the emitters of transistors 44 and 46 are tied together through a 0.002 microfarad capacitor 60. The collector of transistor 55 is coupled through a 1 kilohm resistor 62 and the second 1 kilohm resistor 63 to −V. Output line 35 is coupled to the junction between resistors 62 and 63. If desired, certain of the transistors and other components in FIG. 3 may take the form of an integrated circuit.

In operation, the VCO 34 has a center frequency primarily determined by the RC time constant in the emitter circuit of transistor 44. The DC control voltage at input IN adjusts the switching levels of the transistors and thereby controls the frequency of the multivibrator. The control voltage applied at the free base does change the symmetry of the output waveform on line 35. However, this does not affect the performance of the demodulator since the symmetrical waveform necessary for synchronous demodulation is not directly obtained from the VCO, but rather from a divider stage coupled thereto.

Figure 2:
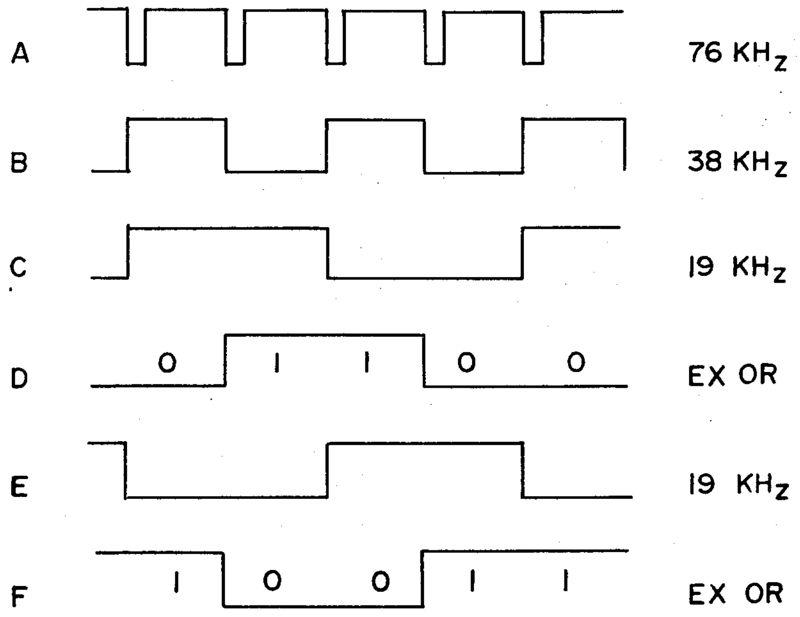
FIGS. 2A–2F are diagrammatic illustrations of voltage waveforms generated by the circuit of FIG. 1.

Returning to FIG. 1, the 76 kHz output from VCO 34 is coupled to a binary frequency divider consisting of a first divide-by-two (2) stage 70 and a second divide-by-two (2) stage 72. Binary stage 70 has a pair of output lines 74 and 75, each having a symmetrical 38 kHz waveform shifted 180° from the waveform on the opposite output line. The waveform on line 75 is illustrated in FIG. 2B. Binary stage 72 has a pair of output lines 24 and 25, each having a symmetrical 19 kHz waveform shifted 180° from the waveform on the opposite output line. The waveform on line 24 is illustrated in FIG. 2C, and the waveform on line 25 is illustrated in FIG. 2E. The binary frequency divider stages 70 and 72 may each be formed by dual JK flip-flops, such as provided by a Motorola integrated circuit, type MC790P.

Output lines 24, 25 from the last binary divider 72 are coupled to phase detector 14 in order to close the phase locked loop (PLL) which includes phase detector 14, filter 30, DC amplifier 32, VCO 34, and frequency divider stages 70 and 72. The PLL locks the output of VCO 34 in phase with the pilot signal, causing the outputs 74, 75 from divider 70 to be a 38 kHz signal locked to the pilot signal. The 38 kHz waveforms are used as an insertion carrier, and are coupled to an audio detector 80 also having an input coupled to the composite input terminal 10. Any conventional synchronous demodulator may form detector 80. Because the output of divider 70 will always be a symmetrical waveform, regardless of the asymmetry or change in symmetry of the VCO waveform, accurate synchronous demodulation is possible, recovering the original modulation data in the form of left (L) and right (R) audio channels. Audio detector 80 may, for example, take the form of the synchronous detector in Motorola's integrated circuit type MC1304, with appropriate change in level.

The demodulation of FIG. 1 includes an in-phase component monitor detector circuit to indicate that input 22 is in quadrature with inputs 24, 25, in order to provide automatic stereo control and indication. The composite input terminal 10 is coupled to an RC high pass filter 84, desirably formed of two stages, having an output to a second phase detector 90, similar to phase detector 14. To detect the presence of the 19 kHz pilot, phase detector 90 has a pair of inputs 92, 93 coupled to a locally generated injection waveform which is 90° out-of-phase or in quadrature with the divided signals at inputs 24, 25 and hence exactly in phase with the pilot signal from terminal 10 when the pilot signal is present. A unique waveform generator for developing this locally generated injection waveform uses the frequency divider stages 70, 72 and also a pair of EXCLUSIVE OR gates 96 and 97.

EXCLUSIVE OR gate 96 has a pair of inputs coupled to the 38 kHz waveform on line 75, FIG. 2B, and to the 19 kHz waveform on line 24, FIG. 2C. The resulting output on line 92, following the conventional rules concerning EXCLUSIVE OR gating, is illustrated in FIG. 2D. EXCLUSIVE OR gate 97 has an input coupled to the same 38 kHz waveform, FIG. 2B, and the other input coupled via line 25 to the 180° shifted 19 kHz waveform, FIG. 2E. The resulting output waveform on line 93 is illustrated in FIG. 2F.

By comparing FIGS. 2D and 2F, it is apparent that the resulting waveforms on lines 92 and 93 are 180° apart, and have a 19 kHz frequency. In addition, these waveforms are shifted without ambiguity 90° from the waveforms in FIGS. 2C and 2E and therefore correspond in phase with the pilot signal. Since the inputs to the phase detector 90 have an in-phase relationship, the output on a line 100 is a signal having an average DC level proportional to the amount of 19 kHz pilot which is present in the composite signal.

By using EXCLUSIVE OR gating, the 19 kHz square waves of FIGS. 2D and 2F are exactly 90° out of phase from the 19 kHz local square wave which is locked in the PLL, and not 270° out of phase which would represent an ambiguity of 180°. If a third frequency divider was connected to trigger on the zero crossings opposite to the zero crossings triggering the divider 72, a 90° shifted 19 kHz waveform would sometimes be generated. However, the triggering could equally occur on the next cycle of the 38 kHz waveform (FIG. 2B), causing the resulting 19 kHz waveform from such a third frequency divider to be shifted 180° from the desired point. The novel EXCLUSIVE OR gating circuit prevents the occurrence of such an ambiguity.

Output line 100 from phase detector 90 is coupled to an RC low pass filter 102, similar to the loop filter 30, in order to produce a DC signal usable for any conventional switching and/or indication purposes. For example, this stereo indication signal may be coupled to a DC amplifier and Schmidtt trigger 104 in order to produce a switched output only when the pilot signal has a predetermined level sufficient for adequate stereo reception. In response to the switched output, a conventional gating circuit 106 activates a visual stereo indicator lamp 108. Gating circuit 106 may also control automatic stereo-monaural switching of the demodulator circuit (not illustrated). AGC control of the phase locked loop may be obtained by use of the DC signal from filter 102. Other well known uses for the detected stereo indication may also be provided.

We claim:

1. In a system including a source of composite signal having a reference component and an information modulated component, a demodulator for recovering the modulated information, comprising:

phase detector means having reference input means and oscillator input means for generating at an output a control signal having a value dependent on the phase difference between signals at said input means;

coupling means connected to said source for coupling said reference component to said reference input means of said phase detector;

controlled oscillator means for generating an oscillatory signal having a frequency a multiple of the frequency of said reference component, the value of the control signal output of said phase detector means controlling the phase of said oscillatory signal;

divider means for frequency dividing said oscillatory signal to produce a divided signal and an insertion signal;

loop means connected to said divider means for coupling said divided signal to the oscillator input means of said phase detector means to produce a phase locked loop including said phase detector means, said controlled oscillator means, and said divider means; and detector means having inputs coupled to said source and said divider means for demodulation of said information modulated component by use of said insertion signal.

2. The demodulator of claim 1 wherein said information modulated component comprises a suppressed carrier signal and said reference component comprises a pilot signal having a pilot frequency a fraction of the frequency of said suppressed carrier, said divider means comprises a plurality of divider stages with said divided signal being produced by the last divider stage and said insertion signal being produced by a divider stage other than the last divider stage.

3. The demodulator of claim 2 wherein said pilot frequency is one-half the frequency of said suppressed carrier, said controlled oscillator means generating said oscillatory signal at a frequency which is a power of two multiple of the frequency of said suppressed carrier, said divider stages each consisting of a divide-by-two means with said insertion signal being produced by the divider stage preceding the last divider stage.

4. The demodulator of claim 3 wherein said controlled oscillator means generates the oscillatory signal at twice the frequency of said suppressed carrier, said divider means comprises two binary divide-by-two means with said insertion signal being produced at one-half the frequency of the oscillatory signal by the first binary means and said divided signal being produced at one-fourth the frequency of the oscillatory signal by said second binary means.

5. The demodulator of claim 2 wherein said controlled oscillator means generates an asymmetrical waveform forming said oscillatory signal, and said insertion signal comprises a symmetrical waveform for synchronous demodulation of said suppressed carrier modulated signal in said detector means.

6. The demodulator of claim 1 wherein said coupling means includes a high pass filter for passing frequencies corresponding to the frequency of the reference component, said high pass filter being formed of passive components.

7. The demodulator of claim 6 wherein said high pass filter comprises an RC network including capacitor means in series between said source and said one reference input means of said phase detector, and resistive means for shunting said capacitor means to a source of reference potential.

8. The demodulator of claim 1 including monitor means coupled to said source for detecting the presence of said reference component in the composite signal.

9. The demodulator of claim 8 wherein said monitor means includes a second phase detector means for generating at an output a signal indicating the presence of said reference component when a pair of inputs have one input coupled to said composite signal and the other input coupled to a local reference component in phase with the reference component of said composite signal, EXCLUSIVE OR means having an output coupled to said other input and a pair of inputs, and gate input means coupling said pair of inputs, inputs of said EXCLUSIVE OR means to said divider means.

10. The demodulator of claim 9 wherein said divider means comprises a plurality of frequency divider stages in cascade, said gate input means coupling said pair of inputs to different divider stages to cause said EXCLUSIVE OR means to produce said local reference component with a 90° phase shift without ambiguity from a signal produced by the last of said frequency divider stages.

11. The demodulator of claim 9 wherein said monitor means includes low pass filter means coupled to said output of said second phase detector means to produce a DC signal proportional to the magnitude level of the reference component.

* * * * *